Figure 1:
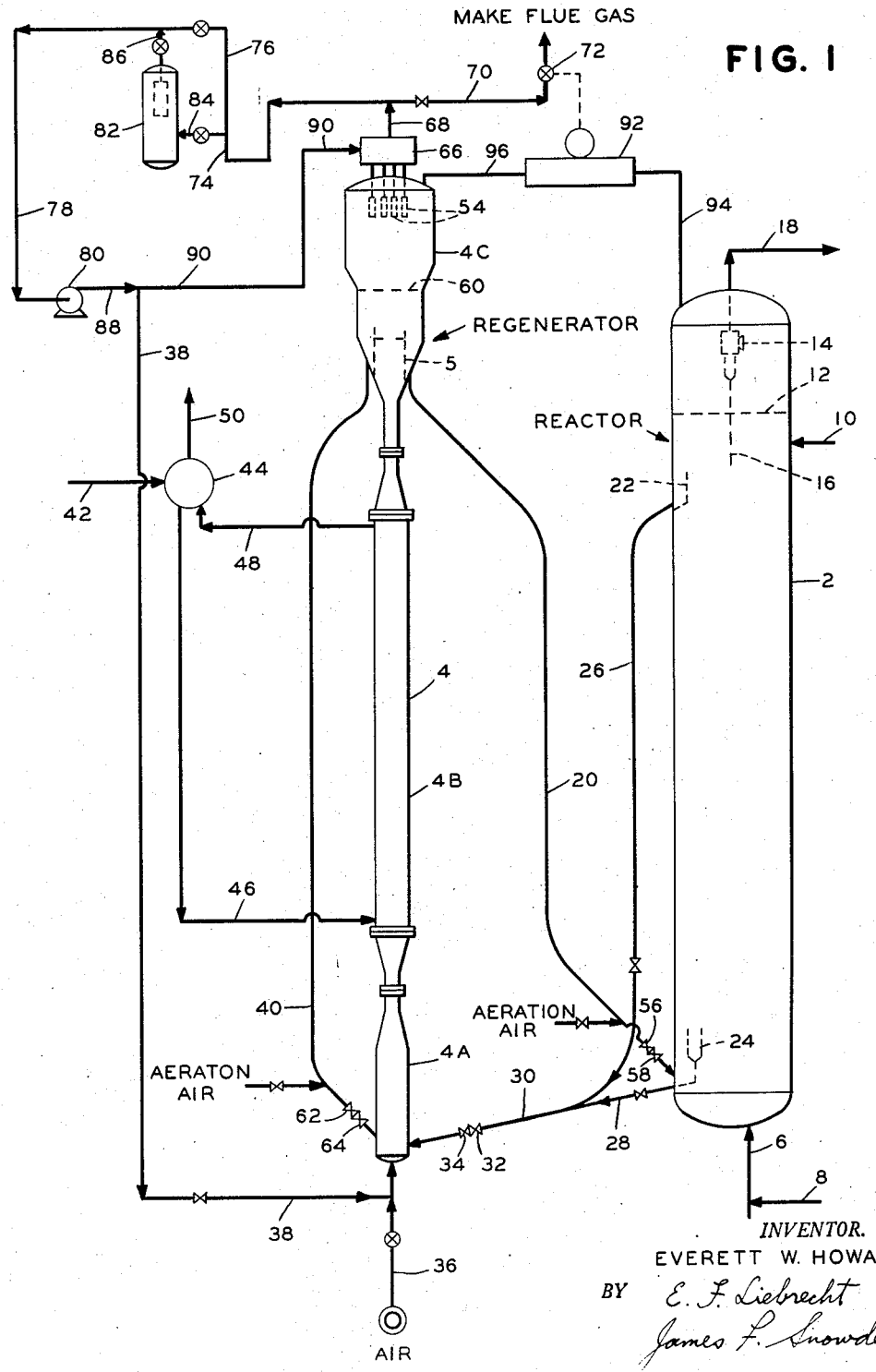

Dec. 7, 1954     E. W. HOWARD     2,696,461

REGENERATION OF HYDROCARBON CONVERSION CATALYSTS

Filed Nov. 30, 1950     2 Sheets-Sheet 1

INVENTOR.
EVERETT W. HOWARD
BY E. F. Liebrecht
James F. Snowden

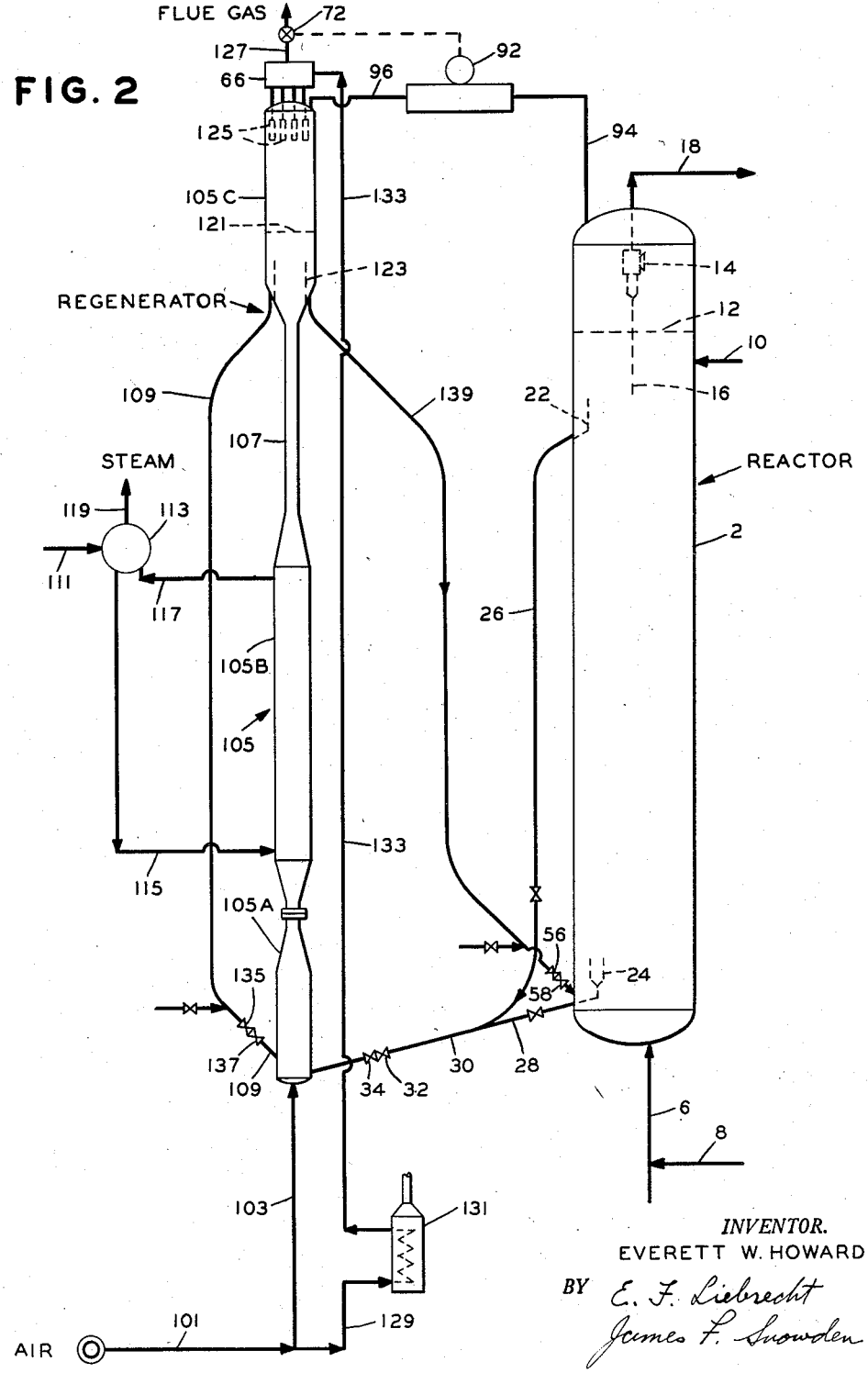

United States Patent Office 2,696,461
Patented Dec. 7, 1954

2,696,461

REGENERATION OF HYDROCARBON CONVERSION CATALYSTS

Everett W. Howard, Glen Rock, N. J., assignor to The M. W. Kellogg Company, Jersey City, N. J., a corporation of Delaware Application November 30, 1950, Serial No. 198,377

11 Claims. (Cl. 196—52)

This invention relates to the catalytic conversion of hydrocarbons and more particularly to the regeneration of the catalyst employed for hydrocarbon conversion.

An object of the present invention is to provide an improved process for the catalytic conversion of hydrocarbons.

A second object of the invention is to provide an improved process for regenerating hydrocarbon conversion catalysts.

A third object of the invention is to provide an improved method for controlling the temperature while regenerating a hydrocarbon conversion catalyst.

A fourth object of the invention is to provide an improved process for controlling the temperature during the regeneration of a fluidized hydroforming catalyst.

Other objects of the invention will in part be obvious and will in part appear hereinafter.

The present invention concerns the regeneration of a finely divided hydrocarbon conversion catalyst bearing deactivating deposits in which the deactivating deposits are burned off by an oxygen-containing regeneration gas at a relatively low superficial velocity in a combustion zone supplied with a stream of cooled regenerated catalyst, the catalyst is carried in entrainment as a relatively dilute suspension in the flue gas from the combustion zone through a cooling zone to an elevated separation zone, the catalyst is separated from the flue gas by reducing the gas velocity below that at which substantial entrainment occurs and a stream of the cooled regenerated catalyst is recycled from the separation zone to the combustion zone. In another modification the flue gas is recycled to the combustion zone as well as regenerated catalyst.

The invention accordingly comprises the several steps and the relation of one or more of such steps with respect to each of the others thereof as will be exemplified in the process hereinafter disclosed and the scope of the invention will be indicated in the claims.

Although the instant process is described hereinafter in detail in connection with a so-called hydroforming process in which dehydrogenation and aromatization of hydrocarbons occur, the present invention is not limited to hydroforming. It may be utilized in hydrodesulfurization, hydrogenation, hydro-cracking (cracking under pressure in the presence of hydrogen) and like reactions employing a finely divided or so-called fluid catalyst which becomes deactivated during the reaction and is regenerated with an oxygen-containing gas in order to restore its activity. With the reactions mentioned, any known fluid catalyst may be used. The data set forth hereinafter is based on hydroforming a Mid-Continent naphtha with the powdered catalyst disclosed in my concurrently filed application Serial No. 198,375 which contains 10% $MoO_3$ and 3% $SiO_2$ on an alumina gel support.

In the regeneration of powdered catalysts, most if not all, are permanently deactivated by excessive heat. The temperatures which cause deactivation vary from catalyst to catalyst, therefore, the proper regeneration temperature will also vary. In the case of the molybdena-alumina catalyst mentioned above, carbonaceous material is deposited on the catalyst particles during the hydroforming reaction and the catalytic activity of the material gradually lessens as a result of these deposits. The deposits may be quickly removed by combustion with air or another oxygen-containing gas at temperatures ranging from 750° F. up; however, exposure to temperatures above 1150° F. has been found to permanently reduce the activity of the contact material. Therefore, this particular catalyst should be regenerated by combustion with an oxygen-containing gas at a temperature between 750° F. and 1150° F. The preferred range of regeneration temperatures extends from about 1050° F. to about 1100° F.

The present invention will best be understood by reference to the accompanying drawings in which Figs. 1 and 2 are flow sheets of two modifications of fluid catalytic hydroforming systems of 7500 barrels per day (B. P. D.) capacity. Heating, fractionating and refining equipment is employed in conjunction with a hydroformer and that shown in the aforementioned concurrent application is well suited for use with the hydroforming process disclosed herein. It should also be noted that all temperatures, pressures and quantities used in refining the crude hydroforming products apply here also.

Referring to Fig. 1, the hydroforming reactor 2 is a cylinder of steel 70½ feet long between the knuckle radii and having an internal diameter of 12 feet. This shell is lined internally with a 4½ inch layer of refractory insulating material to minimize heat losses and corrosion. Regenerator 4 consists of three sections. Regeneration of the partially spent catalyst from the hydroforming reactor is accomplished in the combustion or regeneration section 4A which has a 3½ foot I. D. cylindrical steel shell. This vessel has straight sides for 6 feet above the lower knuckle radius and then tapers to a flange or other suitable fitting by which it is joined to a cooler 4B. This heat exchange section has 117 parallel 1¼ inch tubes (#12 B. W. G.) which are 36 feet long. This provides an effective cross-sectional area for an upflowing catalyst suspension of 0.64 square feet. At the top this cooler tapers down to a flange matching that of the 8-inch pipe inlet (0.35 square feet effective internal cross-section) to separation or collection hopper 4C where a dense phase bed of the catalyst is maintained. Vessel 4C widens to a 4¾ foot I. D. steel shell for a length of 10 feet. Above this the internal diameter of the shell is increased to 6½ feet for a distance of 15 feet up to the upper knuckle radius. The interior of separation section 4C is lined with 4½ inches of refractory insulation down to the bottom of collar 5.

A typical feed for reactor 2 consists of fresh naphtha of 48.5° A. P. I. gravity plus light hydrocarbons stripped from the product gas in an absorption tower (not shown) in the refining system. By this means, the quantity of hydrocarbons charged to the reactor is increased from 86,070 pounds per hour (7515 B. P. D.) to 88,828 pounds per hour (7800 B. P. D.) of a somewhat lighter liquid having a 49.8° A. P. I. gravity. This naphtha charge is heated to 990° F. and pumped into the reactor through line 6. Recycled product gas containing 29.2 mol percent of hydrogen from a separating drum (not shown) in the refining apparatus is compressed to about 550 pounds per square inch gage (p. s. i. g.) and heated to 1100° F. From pipe 8 this recycle gas enters and mixes with the naphtha vapor in feed line 6. Preferably, the reactor 2 is provided with a distributor plate (not shown) at the lower knuckle radius. Above this extends a 54½ foot deep reaction bed of powdered hydroforming catalyst. The bottom of the bed is maintained at a temperature of 950° F. and a pressure of 515 p. s. i. g. In addition to the reactants bubbling up through the dense turbulent bed, a slurry of catalyst fines in polymer is returned to the reactor in line 10 from a catalyst scrubber (not shown) at the rate of 680 lbs./hr. of catalyst in 5460 lbs./hr. of the high boiling oil or polymer which has an A. P. I. gravity of 15°. It will be noted that this is a recycle stream, like the recycled product gas, and not additional feed. The space velocity in the hydroformer amounts to 0.4 pound of naphtha per hour per pound of catalyst in the reaction bed. This produces a density of 39 lbs./cu. ft. and the average superficial velocity of gases in the bed amounts to 0.42 ft./sec. The catalyst-naphtha charging ratio of 0.088 is extremely low. Due to the turbulence in the dense bed of the catalyst, temperature variations are small and the average bed temperature is 940° F. The gasiform mixture separates from the hydroforming catalyst at the interface at the top of the bed 12. Above this point most of the entrained catalyst drops out of suspension leaving only a small quantity of catalyst fines entrained in the gas in what is known as a dilute or dispersed phase. In this zone the temperature is 930° F. and the pressure is 500 p. s. i. g. The gasiform mixture passes into a cyclone separator 14 located inside of reactor 2, and provided with a dip leg 16 extending down into the dense phase below interface 12. Although this separator removes a large percentage of the catalyst remaining suspended in the gas, extremely fine particles are retained in the reaction products as they go overhead into line 18.

The overhead consists of 680 lbs./hr. of catalyst fines in addition to 171,620 lbs./hr. or 510.7 pound mols per hour (M. P. H.) of reaction products. From these crude products the aforementioned refining system produces 65,430 lbs./hr. (5820 B. P. D.) of 52° A. P. I. stabilized gasoline, and as by-products 4750 lbs./hr. (330 B. P. D.) of 12° A. P. I. polymer consisting chiefly of aromatic hydrocarbons, 8666 lbs./hr. (243.7 M. P. H.) of stabilizer gas, and 6511 lbs./hr. (410 M. P. H.) of absorber tail gas (not including the lean oil loss of 170 lbs./hr. or 15 B. P. D. of naphtha by evaporation from the top of the absorber). The yields may be expressed in standard form in the material balance below. As will later be apparent, this balance is equally applicable to the hydroforming plant of Fig. 2.

*Material balance*

|  | Vol. Percent | Wt. Percent | Mol. Wt. | °API | Oct. No. CFRM | Lbs./Hr. | BPD |
|---|---|---|---|---|---|---|---|
| Naphtha feed | 100.0 | 100.0 | 143.0 | 48.5 | 25 | 85,900 | 7,500 |
| Dry gas |  | 16.3 | 22.2 |  |  | 14,000 |  |
| 100% C4 gasoline | 79.2 |  | 102.9 | 52.6 | 80 | 66,420 | 5,941 |
| Polymer | 4.4 |  | 175.0 | 12.0 |  | 4,750 | 330 |
| Carbon |  | 0.85 |  |  |  | 730 |  |

For each of the systems disclosed herein the catalyst inventory is 110 tons; hydrogen production amounts to 162 cu. ft./bbl. of naphtha feed; and the recycle gas rate is 5000 cu. ft./bbl. of naphtha, the gas volumes both being measured at 60° F. and 760 mm. mercury pressure.

By gradually adding regenerated catalyst and withdrawing partially spent catalyst at a low rate, the overall activity of the bed of catalyst in hydroformer 2 is maintained constant and thorough mixing of the particles of contact material by the passage of reactant vapors therethrough maintains the catalytic activity substantially constant throughout the bed. 7530 lbs./hr. of regenerated catalyst is introduced from the 2½ inch pipe 20 at a density of 39 lbs./cu. ft. and temperature of 650° F. An equivalent amount of partially deactivated catalyst, averaging 8372 lbs./hr., with the carbonaceous deposits on the spent catalyst accounting for the difference, is withdrawn through either or both of draw-off wells 22 and 24 into transfer pipe 26 or 28 and then into the line 30. These are 2½ inch O. D. pipes and the catalyst flows at a density of 39 lbs./cu. ft. and velocity of 2.2 ft./sec. The flow through line 30 is governed by safety valve 32 and control valve 34 and the catalyst being transferred is maintained in an aerated condition by the addition of total 4 lbs./hr. of steam at suitable intervals along the line.

The spent catalyst enters the regeneration section 4A about one foot above the distributor plate at the knuckle radius therein. The static pressure at the point of entrance is 509.7 p. s. i. g. and, therefore, the transfer of catalyst is readily produced by the static pressure existing in reactor 2 plus the gravity or fluistatic head developed in the transfer lines. In normal operation, the flow of catalyst from the reactor to the regenerator is regulated by valve 34. It is preferred to control this valve manually in response to frequent carbon analyses of the spent catalyst made on samples withdrawn through a tap (not shown) in pipe 30 in such manner as to maintain about 5% coke or carbonaceous matter on the spent catalyst. However, the safety valve 32 is also located in the transfer line and operates to shut off the flow of catalyst completely whenever the pressure drop across the two valves 32 and 34 drops below about 2.0 p. s. i. This prevents back flow of regeneration gas into the hydroforming reactor under any circumstances. A differential pressure controller (not shown) with pressure taps across the two valves serves to measure the pressure drop across the and to operate valve 32 in the manner described. The pressure immediately above valve 32 is 516.1 p. s. i. g.

The carbonaceous deposits are removed from the partially spent catalyst in regeneration section 4A by combustion with air diluted with cooled recycled regeneration flue gas. 10,654 lbs./hr. (370 M. P. H.) of air is supplied by line 36 at a pressure of 530 p. s. i. g. and a temperature of 300° F. resulting from its compression. This is mixed with 16,920 lbs./hr. (555 M. P. H.) of flue gas from pipe 38 which has been cooled to 650° F. The flue gas contains 1.86 mol percent of oxygen and little or no carbon monoxide. It is preferred to control the air in line 36 and the flue gas in line 38 by manual regulation of valves in the respective lines. At the inlet of combustion vessel 4A the regeneration gases amount to 27,574 lbs./hr. (925 M. P. H.) and have an oxygen content of 9.5 mol percent. The combustion in chamber 4A of the carbonaceous deposits on the catalyst raises the catalyst temperature to 1100° F. Higher regeneration temperatures are avoided by the admission through line 40 of 64,000 lbs./hr. of regenerated catalyst at a temperature of 650° F. from a source to be described later as well as the aforementioned recirculation of flue gas at 650° F. Since the preferred catalyst is not deactivated by temperatures below 1150° F., the margin of safety is ample. The pressure at the bottom of combustion chamber 4A is 510.0 and that at the top is 508.4 p. s. i. g. In the wide part of this vessel the catalyst density is 23 lbs./cu. ft. and the superficial gas velocity is about 1.5 ft./sec. Thus the catalyst is maintained in a dense phase at this point. As the dense phase suspension gradually moves upward, the tapering of vessel 4A gradually accelerates the gas stream to a point where substantially all the catalyst particles are entrained in the stream in a suspension of much less density.

In cooler 4B the superficial velocity of gas in the tube is 11.7 ft./sec. and the catalyst density is 3.7 lbs./cu. ft. In passing up through the cooler the temperature of the suspension of finely divided solids is reduced from 1100° F. down to 650° F. by the transfer of 11,175,000 B. t. u./hr. to the cooling medium. The pressure at the extreme bottom of the cooling section is 508.4 p. s. i. g. and this decreases to 507.6 at the beginning of the tube bundle to 504.7 at the top of the tubes and to 503.9 p. s. i. g. at the exit flange. In cooling vessel 4B, 12,000 lbs./hr. of water at 240° F. and 525 p. s. i. g. are passed through line 42 into drum 44 and through the circuit of line 46, cooler jacket 4B and line 48. The steam produced is removed via line 50 at a pressure of 525 p. s. i. g. and 98 percent quality.

Continuing into hopper section 4C, the suspension moves upward with a superficial gas velocity of 20 ft./sec. and catalyst density of about 3.7 lbs./cu. ft. As the cross-sectional area of this vessel increases, the velocity decreases and the catalyst settles out into a bed at the top and sides of collar 5. If desired, a grid may be provided across the top of this collar to support the catalyst bed. In this dense phase bed the superficial gas velocity is only 0.48 ft./sec. and the density is 37 lbs./cu. ft. Immediately above and in upper communication with the bed is the dilute phase disengaging zone of greater cross-sectional area where the gas velocity is only 0.23 ft./sec. A space 15 feet high is provided here and comparatively little of the powdered catalyst remains entrained in the gas. Any remaining catalyst fines are removed from entrainment in the gas by the filters 54 which are constructed of porous metal or ceramics; stainless steel being preferred for the purpose.

From the lower part of the dense phase bed in section 4C, regenerated catalyst is drawn off in line 20 and returned in the lower part of reaction bed of hydroformer 2. This transfer of catalyst is controlled by valves 56 and 58 which, like all other valves in the catalyst circulation system, are slide valves. Safety valve 56 operates in response to a differential pressure controller (not shown) and closes whenever the pressure drop across valves 56 and 58 becomes less than 2.0 p. s. i. The normal pressure drop is 4.5 p. s. i. Transfer line 20 is aerated by the introduction of 6 lbs./hr. of compressed air through taps installed above valve 56 at suitable points along the length of the conduit. By means of the fluistatic pressure head developed, the static pressure of 500.2 p. s. i. g. in the top of hopper 4C is increased to 519 p. s. i. g. immediately above valve 56. In normal operation the flow of the catalyst to reactor 2 is regulated by valve 58 in response to another differential pressure controller (not shown) which maintains the interface 60 of the spent regenerator bed at a constant level in section 4C by means of pressure taps located above and below the interface.

In comparison with the quantity of regenerated catalyst returned to the reactor, a much larger amount of the regenerated catalyst in the bed in chamber 4C is drawn off at 650° F. temperature prevailing therein through line 40 and recycled at a density of about 39 lbs./cu. ft. to combustion section 4A in order to assist in controlling the temperature of the exothermic combustion reaction. To accomplish this 64,000 lbs./hr. of regenerated catalyst, on the average, are passed down the 6-inch line 40 and reach safety valve 62 at a static pressure of 521.2 p. s. i. g. Slide valve 64 is used to throttle the recirculation of the catalyst within the regeneration system in response to a conventional temperature control device (not shown) for the bed in vessel 4A, which opens the valve more when the temperature exceeds 1100° F. and reduces the catalyst flow when the temperature drops below 1100° F. The internal pressure drop across valves 62 and 64 at the flow rate indicated is 11.5 p. s. i., and a differential pressure controller (not shown) governs the operation of safety valve 62, closing this valve whenever the pressure drop across the two valves becomes less than 2.0 p. s. i. Aeration air is also introduced at suitable points along the pipe 40 above valve 62 at the total rate of 60 lbs./hr. (2.1 M. P. H.).

Filters 54 consist of a number of units, and the filtered gas passing therethrough exits through a manifold in the automatic blow-back apparatus 66. Continuing into line 68 this flue gas which has an average molecular weight of 30.5 is split into two portions. One portion passes through pipe 70 and regulating valve 72 to the atmosphere at an average rate of 11,282 lbs./hr. The remainder is conducted by pipes 74, 76 and 78 to the blower or compressor 80 at the rate of 21,490 lbs./hr. To prevent any entrained solids from reaching the blower 80, an auxiliary filter 82 is provided for use only when one or more of the filters 54 is cracked or otherwise permits the escape of entrained fines in the effluent gases. In this case, line 76 is not employed and the gas is by-passed through line 84, filter 82 and pipe 86 until the damaged filter 54 can be repaired or replaced. Leaving blower 80, where the pressure has been boosted about 30 p. s. i., the gas passes along line 88 and is then divided between line 39 and line 90. Line 90 conducts 4570 lbs./hr. of the regeneration flue gas to the blow-back valve apparatus 66 where an automatic time cycle controller admits the gas sequentially to the interior of one after another of filters 54. Blow-back apparatus 66 operates to clear one filter at a time by reversing the flow of gas therethrough to clear the mass of accumulated catalyst fines from the exterior of the filters; meanwhile, the remaining filters continue to filter out fines from the gas leaving the disengaging zone.

It is apparent that the circulation of catalyst from the reactor 2 to the regenerator 4 and back depends on the maintenance of proper static pressures throughout the catalyst circulatory system, and that all of those static pressures in turn depend on one or both of the back pressures existing at the tops of reactor 2 and regenerator hopper 4C. Pressure balance throughout the entire reaction-regeneration system is governed by differential pressure controller 92 which is connected to the top of reactor 2 by line 94 and to the top of section 4C by line 96. Controller 92 regulates valve 72 to exhaust more or less flue gas from the regeneration system in order to restore the pressure differential between the top sections of reactor 2 and regenerator 4, whenever that pressure differential departs substantially from the 0.2 p. s. i. prescribed herein.

For maximum economy the air supplied to combustion chamber 4A at high pressure should amount to only a slight excess, as for instance 10 percent, over that required to burn all the carbonaceous material on the partially spent catalyst entering through line 30. In the combustion of such matter on a molybdena-alumina catalyst, little or no carbon monoxide is produced when the air supply amounts to 100 percent or more of that theoretically required for complete combustion, as the catalyst promotes a complete combustion reaction. Thus, the flue gas from this reaction is substantially completely composed of inert gases save for any small excess of oxygen present. At any rate, no substantial quantity of reducing gases are present. Therefore, after cooling, this inert gas is entirely suitable for recycling to the combustion reaction to maintain said reaction at the prescribed temperature. Since both recycle flue gas and cool regenerated catalyst are employed to cool or control the combustion reaction, they must be recycled in quantities sufficient for the purpose; however, the greatest economy is realized by utilizing the recycled catalyst as the major cooling medium for no power is required in recycling it to the combustion zone. Still the flue gas recycled through line 38 in combination with the products of combustion derived from the air entering in line 36, must provide a sufficient volume of gas for entraining all of the catalyst in the combustion chamber 4A in order that it may be carried up to the regenerator hopper 4C.

Turning now to Fig. 2; it shows a modified hydroforming plant in which the regeneration temperature is controlled directly by recirculation of regenerated and cooled catalyst. All of the regeneration flue gas is vented to the atmosphere instead of being recycled in part to the combustion section of the regenerator as is the case with Fig. 1. The hydroforming reactor, hydroforming reaction conditions, and crude products of Fig. 2 are all identical with those set forth in connection with Fig. 1. Since the hydroformer effluent is the same, the crude reaction products may be refined in the same manner and yield the same products and by-products. Identical reference numerals are employed in Fig. 2 for elements which are identical with those in Fig. 1 and the accompanying description is concerned chiefly with the modified regeneration system.

The regenerator 105 consists basically of combustion section or chamber 105A, cooler 105B, and the separation section or regenerated catalyst hopper 105C. Section 105A is a cylinder extending 6 feet above the knuckle radius and then tapering down to its junction with the heat exchange section 105B. The maximum internal diameter of the steel shell of the combustion chamber is 3½ feet and this is lined internally with a 4½ inch layer of suitable refractory material. Cooler 105B comprises a bundle of 97 tubes of 1¼ inches diameter (#12 B. W. G.) through which the regenerated catalyst is carried. The cooling water circulates outside of these tubes within a suitable shell. This heat exchanger terminates in a high velocity 6 inch I. D. carrier line 107, 25 feet long and having an effective internal cross-section of about 0.2 square feet. Line 107 is attached at its upper end to the bottom of hopper section 105C. This hopper has a bottom of rapidly enlarging cross-section below a 22-foot long vertical cylindrical steel shell of 4½ foot I. D., lined internally with a 4½ inch refractory layer. 18,661 lbs./hr. of compressed air is supplied by pipe 101 at 530 p. s. i. g. and 300° F. Of this, 15,981 lbs./hr. are carried by line 103 to combustion chamber 105A.

As indicated in connection with Fig. 1, valve 32 is an automatically operated safety valve and the flow of partially deactivated catalyst through line 30 to combustion chamber 105A is normally governed by manual control of valve 34 in accordance with the carbon content of the catalyst. The average flow rate is 8372 lbs./hr. at a velocity of 2.2 ft./sec. In addition 106,600 lbs./hr. of regenerated catalyst, which has been cooled to 800° F., is introduced from 6-inch I. D. line 109. This flow of recycled catalyst is adjusted to keep the regeneration temperature in section 105A at about 1100° F. The air supplied through line 103 amounts to about a 50 percent excess over that required to burn off all carbonaceous deposits; this excess is necessary in order to have a sufficient volume of gases to entrain and carry up all of the deactivated catalyst plus the recycled catalyst to separation hopper 105C.

The finely divided catalyst is suspended as a dense phase in the regenerating gas in the widest portion of the combustion chamber 105A. It moves slowly upward into the tapering portion of this chamber, and as the effective cross-sectional area is reduced, the gas and solid particles are gradually accelerated as they approach the exit at the top of this vessel. Eventually, the solids are entrained in the gas and carried upward therein with only minor slippage. The pressure at the distribution plate at the knuckle radius of 105A is 510.0 p. s. i. g. and this decreases to 507.9 p. s. i. g. at the top of the vessel. The superficial gas velocity in the widest portion of the combustion chamber is 1.0 ft./sec. and the catalyst density there is 29 lbs./cu. ft.

The temperature of the catalyst and transporting flue gas is reduced in cooler 105B from 1100 to 800° F. by transferring 10,330,000 B. t. u./hr. to the coolant surrounding the tubes. The cooling water is circulated through line 111, drum 113, pipe 115, cooler 104B, and lines 117 and 119; 10,640 lbs./hr. of water at 240° F. and 150 p. s. i. g. being introduced in line 111 and the same quantity of steam leaving in line 119 at 150 p. s. i. g. and 98 percent quality. Inside the tubes of section 105B, the superficial gas velocity is 10 ft./sec. which results in a catalyst density of 8 lbs./cu. ft. The static pressure at the entrance of the tube bundle in cooler 105B is 506.9 p. s. i. g. and, at the exit, the corresponding pressure is 503.4 p. s. i. g.

In high velocity line 107, the bottom and top pressures are 502.7 and 500.5 p. s. i. g. respectively. Although, the superficial gas velocity reaches 26 ft./sec. here, the concentration of catalyst remains unchanged at 8 lbs./cu. ft.

In the separation hopper 105C, the cross-sectional area is much larger and slows the gas stream down to a superficial velocity of 0.4 ft./sec. in the main body of this vessel. This is well below the velocity required ot entrain a substantial part of the powder, so most of the catalyst readily settles out in a dense phase bed (39 lbs./cu. ft.) having an upper level or interface 121. Desirably, this interface is maintained about 15 feet below the knuckle radius of the vessel and the pressure and temperature in this dilute phase disengaging zone are 498.2 p. s. i. g. and 800° F. respectively. The quietest portion of the bed lies outside the collar or ring 123 which is provided around the inlet through which the catalyst-laden gas enters. If desired, a perforate grid or distribution plate may be placed across the top of collar 123 to support the catalyst bed. All outlets of the powdered catalyst from vessel 105C are preferably located below the top of the collar.

Filters 125 of porous stainless steel are provided to remove the last traces of catalyst fines from the regeneration flue gas. This gas passes from the filters into the automatic time cycle blow-back valve controller 66, which was described previously; from there it is conducted into exhaust line 127 containing a regulating valve 72 which is controlled by differential pressure controller 92 in response to variations in the pressure differential between the tops of reactor 2 and regenerator 105. The flue gas is released to the atmosphere at the rate of 19,367 lbs./hr. (649.5 M. P. H.). In some instances it may be desirable to use a portion of this high pressure flue gas as a blow-back medium for clearing the filters. Such an arrangement would render the blow-back heater unnecessary, but would call for an additional small compressor to boost the flue gas pressure about 20 or 30 lbs./sq. inch p. s. i. In the plant shown in Fig. 2, 2690 lbs./hr. of air in line 101 are drawn off in pipe 129 and pass through the blow-back heater 131 where the temperature is increased from 300 to 800° F. This air is then delivered by line 133 to the blow-back valve controller 66, where it is used to clear each of the filters 125 in proper sequence by temporarily reversing the flow of gas therethrough. Breakage of the filters caused by thermal shock is minimized by the aforementioned heating of the blow-back air.

As previously indicated, a large amount of catalyst is recycled to the combustion chamber 105A through line 109 at a density of 40 lbs./cu. ft. To maintain the catalyst in the fluidized condition in this line, air is introduced at one or more points, preferably near the bottom at the rate of 60 lbs./hr. The gravity or fluistatic pressure head in this column of catalyst is sufficient to overcome the pressure differential between vessels 105C and 105A. As a result of the pressure immediately above safety slide valve 135 is 518.4 p. s. i. g. which is adequate to provide an 8.8 p. s. i. pressure drop across valves 135 and 137. Safety valve 135 is operated in response to a differential pressure controller (not shown) with pressure taps above and below said two valves. This arrangement serves to shut off the flow of catalyst through the line whenever the drop becomes substantially less than 2.0 p. s. i. Slide valve 137 may be controlled manually but is preferentially regulated automatically in response to the demands of a temperature indicating element in the bed of catalyst in combustion chamber 105A. Such equipment is of well known construction and need not be further described here. It operates to increase the flow of cooled recycled catalyst whenever the temperature in combustion chamber 105A exceeds 1100° F., and to throttle down the flow of this "inert" material when the temperature decreases in the combustion zone.

Regenerated catalyst at 800° F. is returned to the lower portion of reactor 2 via the 2½-inch line 139 at a density of 48 lbs./cu. ft. and an average rate of 7530 lbs./hr. This pipe is similar in all other respects save length to line 29 in Fig. 1. The pressure immediately above valve 56 is 519.4 p. s. i. g.

From the above description, it is apparent that the catalyst is circulated from the reactor to the combustion chamber solely under the influence of pressure, including that developed as a fluistatic or gravity head by the catalyst in the transfer line, so that the abrasive solids do not come in contact with any pumps or other moving parts. In the regenerator the contact material is carried from the combustion chamber through the cooler to the separation hopper at relatively high velocity by the rapid stream of regeneration gas. The return of the catalyst from the separation hopper to the reactor is brought about by the fluistatic head developed in the relatively long return line. Both of the circulation systems disclosed herein are based on the principles set forth in my concurrently filed application Serial No. 198,375 and the ranges of catalyst densities and superficial gas velocities set forth therein are equally applicable here. It will be noted, in both Figs. 1 and 2, that the smallest cross-section through which the catalyst suspension passes on its way from the combustion chamber to the separation hopper is locaated immediately below the hopper. This was so designed to increase the superficial gas velocity about 5 to 20 ft./sec. above the velocity through tubes of the cooler in order that the conduit between the cooler and hopper would serve as a check valve to avoid any refluxing of the powdered catalyst from the elevated hopper back to the cooler.

The combustion of the carbonaceous matter on the catalyst is thought to be complete in the lower combustion vessel. However no undesirable results are produced even if the burning does continue in the cooler.

Superior results are obtained by cooling the powdered solids while they are passing up through the cooler as a relatively dilute suspension in rapidly moving gases. There is no tendency of the tubes of the cooler to plug due to the bridging of deaerated catalyst, a difficulty which is frequently encountered in the downflow cooling of powdered materials. The distribution of catalyst between the tubes of the bundle is more even; hence better temperature control is obtained. Better heat transfer rates are produced by the relatively high velocity of the suspension. In addition, upflow cooling serves to lift the powdered contact material to an elevated separation hopper from which the solids may be returned to the reactor by gravity.

The degree to which the regenerated catalyst and gas is cooled may be varied rather widely. It is preferred to reduce the temperature at least about 200 degrees, and usually more, below those temperatures which are detrimental to the catalyst in cases where the flue gases were circulated. It is recommended that the regenerated catalyst and flue gas be cooled to about 650° F. to preserve the flue gas recirculating compressor against excessive temperatures. However, it must be remembered that the more the regenerated catalyst is cooled, the more the heat which must be supplied to the hydroforming reaction zone to raise the returning regenerated catalyst to the reaction temperature. Thus, it will be noted that the regenerated catalyst is only cooled to 800° F. in Fig. 2 and this is considered to be the optimum in cases where there is no recycling of flue gas to the regenerator.

A system in which the regeneration temperature is controlled entirely by recycling cooled catalyst may be operated at either atmospheric or elevated pressures; whereas cooling by recycling flue gas or both catalyst and flue gas is only feasible for regeneration systems operating at pressures of at least about 100 p. s. i. g. because the amount of heat which would be absorbed from the combustion reaction by flue gas at atmospheric pressure would be rather minor. Each of the two systems shown has certain advantages. The regenerator of Fig. 1, where cooling of the combustion reaction is carried out by recycling both flue gas and regenerated catalyst, provides a system which is subject to very flexible yet comparatively simple control; moreover no blow-back gas heater is required for normal operations. On the other hand the plant shown in Fig. 2, in which all cooling is performed by recycling regenerated catalyst alone, may be controlled in a simpler but somewhat less flexible manner. In addition, the latter requires less filter area but considerably more power to compress from atmospheric to 500 p. s. i. g. pressure the 50 percent excess air required to lift the large amount of catalyst.

Since certain changes may be made in carrying out the above process without departing from the scope of the invention it is intended that all material contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween.

Having described my invention, what I claim as new and desire to secure by Letters Patent is:

1. A process for the regeneration of a hydrocarbon conversion catalyst which comprises introducing a dense fluidized stream of finely divided conversion catalyst bearing deactivating deposits into a combustion zone which is supplied with a stream of recycled cooled regenerated catalyst, removing at least part of the deactivating deposits in the combustion zone in a dense phase by combustion with an oxygen-containing regeneration gas which is supplied as a separate stream directly thereto and which passes through said combustion zone at a relatively low superficial linear velocity, conveying from the combustion zone all of the catalyst at essentially the same rate as charged thereto as a suspension in a gas stream comprised of all the flue gas resulting from the combustion of the deactivating deposits upwardly through an elevated cooling zone at a relatively higher superficial linear gas velocity than exists in the combustion zone such that the suspension is a relatively lean phase, flowing the cooled gaseous suspension of solids from the cooling zone upwardly to an elevated separation zone at a superficial linear gas velocity relatively higher than what exists in the cooling zone in order to prevent catalyst from falling back into the cooling zone, separating the suspended regenerated catalyst from the gas stream to form a dense fluidized bed in the separation zone essentially by decreasing the superficial linear gas velocity below that at which substantial entrainment of catalyst occurs, and recycling a stream of cooled regenerated catalyst from the dense bed in the separation zone to the aforesaid combustion zone.

2. A process for the regeneration of a hydrocarbon conversion catalyst which comprises introducing a dense fluidized stream of finely divided conversion catalyst bearing deactivating deposits into a combustion zone which is supplied with a stream of recycled cooled regenerated catalyst, removing at least part of the deactivating deposits in the combustion zone in a dense phase by combustion with a regeneration gas of relatively low oxygen content which is supplied as a separate stream directly thereto and which passed through said combustion zone at a relatively low superficial linear velocity, conveying from the combustion zone all of the catalyst at essentially the same rate as charged thereto as a suspension in a gas stream comprised of all the flue gas resulting from the combustion of deactivating deposits upwardly through an elevated cooling zone at a relatively higher superficial linear gas velocity than exists in the combustion zone such that the suspension is a relatively lean phase, flowing the cooled gaseous suspension of solids from the cooling zone upwardly to an elevated separation zone at a superficial linear gas velocity relatively higher than what exists in the cooling zone in order to prevent catalyst from falling back into the cooling zone, separating the suspended regenerated catalyst from the gas stream to form a dense fluidized bed in the separation zone essentially by decreasing the superficial linear gas velocity below that at which substantial entrainment of the catalyst occurs, recycling a stream of cooled regenerated catalyst from the dense bed in the separation zone to the aforesaid combustion zone, and forming the regeneration gas by mixing a portion of the cooled gas stream with an oxygen-supplying gas stream for circulation to the aforesaid combustion zone.

3. The process of claim 1 wherein the oxygen for the oxygen-containing regeneration gas is supplied by means of air.

4. The process of claim 2 wherein the oxygen-supplying gas stream is air.

5. A process for the regeneration of a hydrocarbon conversion catalyst which comprises introducing a dense fluidized stream of finely divided conversion catalyst bearing deactivating deposits into a combustion zone supplied with a stream of recycled cooled regenerated catalyst and maintained at a temperature not greater than about 1150° F., removing at least part of the deactivating deposits in the combustion zone in a dense phase by combustion with an oxygen-containing regeneration gas which is supplied as a separate stream directly thereto and which passes through said combustion zone at a relatively low superficial linear velocity, conveying from the combustion zone all of the catalyst at essentially the same rate as charged thereto at a suspension in a gas stream comprised of all the flue gas resulting from the combustion of deactivating deposits upwardly through an elevated cooling zone at a relatively higher superficial linear gas velocity than exists in the combustion zone such that the suspension is a relatively lean phase in order to cool the gaseous suspension of the catalyst to a temperature of at least about 200° F. lower than what is maintained in the combustion zone, flowing the cooled gaseous suspension of catalyst from the cooling zone upwardly to an elevated separation zone at a superficial linear gas velocity of about 50 to about 20 feet per second higher than what exists in the cooling zone in order to prevent catalyst from falling back into the cooling zone, separating the suspended regenerated catalyst from the gas stream to form a dense fluidized bed in the separation zone essentially by decreasing the superficial linear gas velocity below that at which substantial entrainment of the catalyst occurs, and recycling a stream of cooled regenerated catalyst from the dense bed in the separation zone to the aforesaid combustion zone.

6. A process for the regeneration of a hydrocarbon conversion catalyst which comprises introducing a dense fluidized stream of finely divided conversion catalyst bearing deactivating deposits into a combustion zone supplied with a stream of recycled cooled regenerated catalyst and maintained at a temperature not greater than about 1150° F., removing at least part of the deactivating deposits in the combustion zone in a dense phase by combustion with a regeneration gas of relatively low oxygen content which is supplied as a separate stream directly thereto and which passes through said combustion zone at a relatively low superficial linear velocity, conveying from the combustion zone all of the catalyst at essentially the same rate as charged thereto as a suspension in a gas stream comprised of all the flue gas resulting from the combustion of deactivating deposits upwardly through an elevated cooling zone at a relatively higher superficial linear gas velocity than exists in the combusition zone such that the suspension is a relatively lean phase in order to cool the gaseous suspension of catalyst to a temperature of at least about 200° F. below that which is maintained in the combustion zone, flowing the cooled gaseous stream of catalyst from the cooling zone at a superficial linear gas velocity of about 5 to about 20 feet per second higher than what exists in the cooling zone in order to prevent catalyst from falling back into the cooling zone, separating the suspended regenerated catalyst from the gas stream to form a dense fluidized phase essentially by decreasing the superficial linear gas velocity below that at which substantial entrainment of the catalyst occurs, recycling a stream of cooled regenerated catalyst from the dense bed in the separation zone to the aforesaid combustion zone, and forming the regeneration gas by mixing a portion of the cooled gas stream with an oxygen-supplying gas stream for circulation to the aforesaid combustion zone.

7. A hydrocarbon conversion process wherein a hydrocarbon reactant is contacted with a dense fluidized mass of finely divided conversion catalyst in a conversion zone thus producing a catalyst bearing deactivating deposits, the improvement which comprises withdrawing a portion of catalyst bearing the said deposit directly from the dense phase in the conversion zone and passing the same as a dense fluidized mass directly to a low region of a combustion zone, maintaining a dense fluidized mass of catalyst in the combustion zone by separately introducing substantially all the oxygen containing regeneration gas at a relatively low superficial linear gas velocity directly into the bottom part of said fluidized mass of catalyst and thus removing at least part of the deactivating deposits by combustion, conveying from the combustion zone all of the catalyst at essentially the same rate as charged thereto as a suspension in a gas stream comprised of all the flue gas resulting from the combustion of deactivating deposits upwardly through an elevated cooling zone at a relatively higher superficial linear gas velocity than exists in the combustion zone such that the suspension is a relatively lean phase, flowing the cooled gaseous suspension of solids from the cooling zone upwardly to an elevated separation zone at a superficial linear gas velocity relatively higher than what exists in the cooling zone in order to prevent catalyst from falling back into the cooling zone, separating a substantial amount of the suspended regenerated catalyst from the gas stream to form a dense fluidized bed by reducing the superficial linear gas velocity, recycling a portion of the cooled regenerated catalyst from the dense bed in the separation zone to the combustion zone, and passing a portion of the cooled regenerated catalyst as a dense fluidized mass directly to a low region of the fluidized mass of catalyst in the conversion zone.

8. A hydrocarbon conversion process wherein a hydrocarbon reactant is contacted with a dense fluidized mass of finely divided conversion catalyst in a conversion zone thus producing a catalyst bearing deactivating deposits, the improvement which comprises withdrawing a portion of catalyst bearing the said deposits directly from the dense phase in the conversion zone and passing the same as a dense fluidized mass directly to a low region of a combustion zone, maintaining a dense fluidized mass of catalyst in the combustion zone by separately introducing substantially all of a regeneration gas of relatively low oxygen content at a relatively low superficial linear gas velocity directly into the bottom part of the fluidized bed and thus removing at least part of the deactivating deposits by combustion, conveying from the combustion zone all of the catalyst at essentially the same rate as charged thereto as a suspension in a gas stream comprised of all the flue gas resulting from the combustion of deactivating deposits upwardly through an elevated cooling zone at a relatively higher superficial linear gas velocity than exists in the combustion zone such that the suspension is a relatively lean phase, flowing the cooled gaseous suspension of solids from the cooling zone upwardly to an elevated separation zone at a superficial linear gas velocity relatively higher than what exists in the cooling zone in order to prevent catalyst from falling back into the cooling zone, separating a substantial amount of the suspended catalyst from the gas stream to form a dense fluidized bed by reducing the superficial linear gas velocity, recycling a portion of the cooled regenerated catalyst from the dense bed in the separation zone to the combustion zone, forming the regeneration gas by mixing a portion of the cooled gas stream with an oxygen supplying gas for circulation to the aforesaid combustion zone, and passing a portion of the cooled regenerated catalyst as a dense fluidized mass directly to a low region of the fluidized mass of catalyst in the conversion zone.

9. A hydrocarbon conversion process wherein a hydrocarbon reactant is contacted with a dense fluidized mass of finely divided conversion catalyst in a conversion zone thus producing a catalyst bearing deactivating deposits, the improvement which comprises withdrawing a portion of catalyst bearing the deposit directly from the dense phase in the conversion zone and passing the same as a dense fluidized mass directly to a low region of the combustion zone, maintaining a dense fluidized mass of catalyst in the combustion zone by separately introducing thereto substantially all of an oxygen containing regeneration gas at a relatively low superficial linear gas velocity directly into the bottom part of said fluidized bed and removing at least part of the deactivating deposits by combustion at a temperature not greater than about 1150° F., conveying from the combustion zone all of the catalyst at essentially the same rate as charged thereto as a suspension in the gas stream comprised of all the flue gas resulting from the combustion of the deactivating deposits upwardly through an elevated cooling zone at a relatively higher superficial linear gas velocity than what exists in the combustion zone such that the suspension is a relatively lean phase and the temperature is lowered by at least about 200° F. than what is maintained in the combustion zone, flowing the cooled gaseous suspension of solids from the cooling zone upwardly to an elevated separation zone at a superficial linear gas velocity of about 5 to about 20 feet per second higher than what exists in the cooling zone in order to prevent catalyst from falling back into the cooling zone, separating a substantial amount of the suspended regenerated catalyst from the gas stream by reducing the superficial linear gas velocity to form a dense fluidized bed, recycling a portion of the cooled regenerated catalyst from the dense bed in the separation zone to the combustion zone, and passing a portion of the cooled regenerated catalyst as a dense fluidized mass directly to a low region of the fluidized mass of catalyst in the conversion zone.

10. A hydrocarbon conversion process wherein a hydrocarbon reactant is contacted with a dense fluidized mass of finely divided conversion catalyst in a conversion zone thus producing a catalyst bearing deactivating deposits, the improvement which comprises withdrawing a portion of catalyst bearing the deposit directly from the dense phase in the conversion zone and passing the same as a dense fluidized mass directly to a low region of the combustion zone, maintaining a dense fluidized mass of catalyst in the combustion zone by separately introducing thereto substantially all of an oxygen containing regeneration gas of relatively low oxygen content at a relatively low superficial linear gas velocity directly into the bottom part of said fluidized bed and removing at least part of the deactivating deposits by combustion at a temperature not greater than about 1150° F., conveying from the combustion zone all of the catalyst at essentially the same rate as charged thereto as a suspension in the gas stream comprised of all the flue gas resulting from the combustion of the deactivating deposits upwardly through an elevated cooling zone at a relatively higher superficial linear gas velocity than what exists in the combustion zone such that the suspension is a relatively lean phase and the temperature is lowered by at least about 200° F. than what is maintained in the combustion zone, flowing the cooled gaseous suspension of solids from the cooling zone upwardly to an elevated separation zone at a superficial linear gas velocity of about 5 to about 20 feet per second higher than what exists in the cooling zone in order to prevent catalyst from falling back into the cooling zone, separating a substantial amount of the suspended regenerated catalyst from the gas stream by reducing the superficial linear gas velocity to form a dense fluidized bed, recycling a portion of the cooled regenerated catalyst from the dense bed in the separation zone to the combustion zone, passing a portion of the cooled regenerated catalyst as a dense fluidized mass directly to a low region of the fluidized mass of catalyst in the conversion zone, and forming the regeneration gas by mixing a portion of the cooled gas stream with an oxygen supplying gas for circulation to the aforesaid combustion zone.

11. A hydroforming process wherein a naphtha fraction is contacted with a dense fluidized mass of finely divided catalyst comprising molybdenum oxide in the presence of added hydrogen such that the catalyst becomes contaminated with a carbonaceous deposit, the improvement which comprises withdrawing a portion of contaminated catalyst directly from the dense phase in the conversion zone and passing the same as a dense fluidized mass directly to a low region of a combustion zone, maintaining a dense fluidized mass of catalyst in the combustion zone by separately introducing substantially all the oxygen containing regeneration gas at a relatively low superficial linear gas velocity directly into the bottom part of said fluidized mass of catalyst and thus removing at least part of the deactivating deposits by combustion, conveying from the combustion zone all of the catalyst at essentially the same rate as charged thereto as a suspension in a gas stream comprised of all the flue gas resulting from the combustion of deactivating deposits upwardly through an elevated cooling zone at a relatively higher superficial linear gas velocity than exists in the combustion zone such that the suspension is a relatively lean phase, flowing the cooled gaseous suspension of solids from the cooling zone upwardly to an elevated separation zone at a superficial linear gas velocity relatively higher than what exists in the cooling zone in order to prevent catalyst from falling back into the cooling zone, separating a substantial amount of the suspended regenerated catalyst from the gas stream to form a dense fluidized bed by reducing the superficial linear gas velocity, recycling a portion of the cooled regenerated catalyst from the dense bed in the separation zone to the combustion zone, and passing a portion of the cooled regenerated catalyst as a dense fluidized mass directly to a low region of the fluidized mass of catalyst in the conversion zone.

References Cited in the file of this patent

UNITED STATES PATENTS

| Number | Name | Date |
|---|---|---|
| 2,355,016 | Stein | Aug. 1, 1944 |
| 2,369,523 | Belchetz | Feb. 13, 1945 |
| 2,383,636 | Wurth | Aug. 28, 1945 |
| 2,409,234 | Arevson | Oct. 15, 1946 |
| 2,412,025 | Zimmerman | Dec. 3, 1946 |
| 2,417,275 | Thompson et al. | Mar. 11, 1947 |
| 2,420,542 | Jahnig | May 13, 1947 |
| 2,454,466 | Le Roi | Nov. 23, 1948 |
| 2,463,912 | Scharmann | Mar. 8, 1949 |
| 2,472,844 | Munday et al. | June 14, 1949 |
| 2,475,650 | Thompson et al. | July 12, 1949 |
| 2,493,911 | Brandt | Jan. 10, 1950 |